United States Patent
Bradley et al.

(10) Patent No.: US 9,790,729 B2
(45) Date of Patent: *Oct. 17, 2017

(54) DETECTING OBJECTS WITHIN A VEHICLE IN CONNECTION WITH A SERVICE

(71) Applicant: Uber Technologies, Inc., San Francisco, CA (US)

(72) Inventors: David McAllister Bradley, Pittsburgh, PA (US); Jean-Sebastien Valois, Pittsburgh, PA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/449,110

(22) Filed: Mar. 3, 2017

(65) Prior Publication Data

US 2017/0175431 A1 Jun. 22, 2017

Related U.S. Application Data

(63) Continuation of application No. 14/708,611, filed on May 11, 2015, now Pat. No. 9,616,773.

(51) Int. Cl.
*E05F 15/70* (2015.01)
*B60R 11/04* (2006.01)
*G05D 1/00* (2006.01)

(52) U.S. Cl.
CPC ............. *E05F 15/70* (2015.01); *B60R 11/04* (2013.01); *G05D 1/0088* (2013.01); *E05Y 2400/44* (2013.01); *E05Y 2400/45* (2013.01); *E05Y 2900/548* (2013.01)

(58) Field of Classification Search
CPC ..... B60N 2/002; G05D 1/0276; G05D 1/0212
See application file for complete search history.

(56) References Cited

U.S. PATENT DOCUMENTS

| | | | |
|---|---|---|---|
| 6,542,111 B1 | 4/2003 | Wilson | |
| 6,795,031 B1 | 9/2004 | Walker | |
| 7,102,496 B1 | 9/2006 | Ernst, Jr. | |
| 7,124,027 B1 | 10/2006 | Ernst, Jr. | |
| 7,783,403 B2 | 8/2010 | Breed | |
| 8,145,402 B2 | 3/2012 | Craig | |
| 8,559,673 B2 | 10/2013 | Fairfield | |
| 9,145,140 B2 | 9/2015 | Ferguson | |
| 9,158,980 B1 | 10/2015 | Ferguson | |
| 9,223,013 B2 | 12/2015 | Stein | |

(Continued)

FOREIGN PATENT DOCUMENTS

| | | |
|---|---|---|
| JP | 2006-159939 | 6/2006 |
| WO | WO 2013155661 A1 | 10/2013 |

OTHER PUBLICATIONS

International Search Report and Written Opinion issued in PCT/US2016/031929 dated Aug. 17, 2016.

(Continued)

*Primary Examiner* — Anne M Antonucci
(74) *Attorney, Agent, or Firm* — Mahamedi IP Law LLP

(57) ABSTRACT

A system for monitoring a vehicle used in providing a service is disclosed. The system detects when the service is complete, and upon detecting that the service is complete, the system determines, from one or more sensors of the vehicle, that an object which should have been removed from the vehicle after completion of the transport service, remains in the vehicle. The system then automatically initiates performance of a remedial action.

20 Claims, 6 Drawing Sheets

(56) References Cited

U.S. PATENT DOCUMENTS

| | | |
|---|---|---|
| 9,330,321 B2 | 5/2016 | Schamp |
| 9,383,753 B1 | 7/2016 | Templeton |
| 9,442,487 B1 | 9/2016 | Ferguson |
| 2003/0040944 A1 | 2/2003 | Hileman |
| 2006/0002586 A1 | 1/2006 | Aggarwal |
| 2006/0208911 A1 | 9/2006 | Davis |
| 2008/0040004 A1 | 2/2008 | Breed |
| 2008/0129475 A1 | 6/2008 | Breed |
| 2009/0010495 A1 | 1/2009 | Schamp |
| 2009/0146813 A1 | 6/2009 | Nuno |
| 2009/0216600 A1 | 8/2009 | Hill |
| 2010/0165323 A1 | 7/2010 | Fiess |
| 2012/0158313 A1 | 6/2012 | Wang |
| 2012/0242492 A1 | 9/2012 | Grunfeld |
| 2014/0046585 A1 | 2/2014 | Morris |
| 2014/0336842 A1 | 11/2014 | Jang |
| 2015/0210274 A1 | 7/2015 | Clarke |
| 2015/0210277 A1 | 7/2015 | Ben Shalom |
| 2015/0247733 A1 | 9/2015 | Horihata |
| 2015/0331422 A1 | 11/2015 | Hartung |

OTHER PUBLICATIONS

International Search Report and Written Opinion issued in PCT/US2016/066235 dated Mar. 27, 2017.

DETECTING OBJECTS WITHIN A VEHICLE IN CONNECTION WITH A SERVICE

CROSS-REFERENCE TO RELATED APPLICATIONS

This application is a continuation of U.S. patent application Ser. No. 14/708,611 filed May 11, 2015, titled "DETECTING OBJECTS WITHIN A VEHICLE IN CONNECTION WITH A SERVICE", the aforementioned application being hereby incorporated by reference herein for all purposes.

BACKGROUND

A service arrangement system can arrange a service to be provided for a requesting user through the use of mobile computing devices. For example, a user can request a service, such as a transport or delivery service, by operating the user's mobile computing device, and the service arrangement system can process the request to select the appropriate provider that can provide the service. The service arrangement system can also monitor the service, such as to determine the current location of the vehicle, before and during the progress of the service.

DETAILED DESCRIPTION

Figure 1:
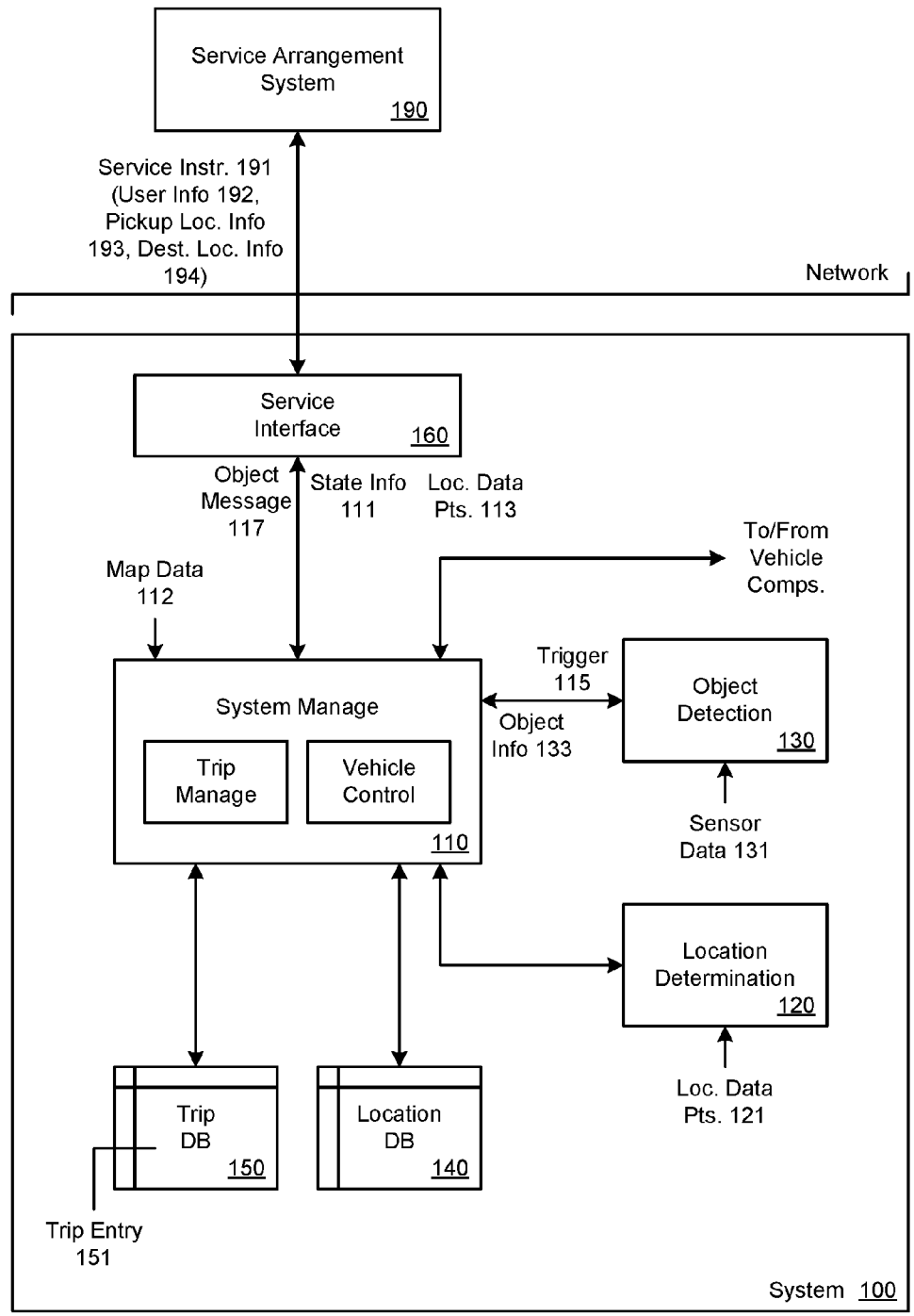
FIG. 1 illustrates an example system to detect objects within a vehicle in connection with a transport service.

According to examples described herein, a service arrangement system, which implement a network service, can receive requests for location-based services and arrange those services to be provided by service providers. As used herein, service providers can include human drivers (or human-driven vehicles) that receive and/or accept invitations for services, and in some instances, autonomous (or self-driving) vehicles that can be used by the network service to transport goods or people. Whether a human-driven vehicle or an autonomous vehicle (AV) is assigned to provide a service, the network service can use information from a set of sensors of that vehicle to perform processes, when necessary, to supplement the assigned service. For example, a computing system associated with a vehicle can determine, through use of sensor data, whether the service has been properly completed or whether an object has inadvertently been left behind in the vehicle.

In some examples, a computing system can determine that a vehicle has been arranged to provide a location-based service. Depending on implementation, the computing system can correspond to a computing system associated with a vehicle (e.g., an on-board computing system of the vehicle, or a driver device operated by the driver of the vehicle) or a computing system(s) that implements the network service (e.g., a backend server system remote from the vehicle). During the performance of the service, the computing system can detect that an object has been placed within the vehicle based on a first set of information from one or more sensors of the vehicle at a first time. As described herein, a sensor is a device that can detect some characteristic of the surrounding environment or detect an event or change in quantity of an amount, and provide a corresponding output (e.g., sensor data). The computing system can detect, at the time the service is being completed or after the service has been completed, whether the object has been removed from the vehicle based on a second set of information from the one or more sensors. In response to detecting that the object is still present in the vehicle (e.g., has not been removed from the vehicle), the computing system can automatically perform a remedial action, such as causing the driver or the vehicle to perform an additional operation that would otherwise not have been performed.

In various examples, a vehicle can include or be equipped with one or more sensors, such as a set of cameras, a set of weighing devices, a set of suspension sensors, a set of light detection and ranging (LIDAR) sensors, a set of ultrasound sensors, a set of location-determination sensors, a set of radio-frequency sensors (such as Bluetooth or Wi-Fi transceivers), as well as other sensors used for various vehicle operations (e.g., engine sensors, tire pressure sensors, door open or close sensors, seat belt sensors, external stereo cameras or LIDAR sensors for AVs, etc.). A set of sensors, as described herein, can correspond to one or more individual sensors or one or more arrays of sensors. Depending on implementation, the computing system can use information (sensor data) from one or more sets of sensors (e.g., an individual sensor or a combination of a plurality of different sensors) to detect whether an object has been placed within the vehicle and/or has been removed from the vehicle.

For example, the computing system can detect a position of an object inside the vehicle based on image information from a set of cameras that are positioned within the vehicle with the respective lens of the set of cameras facing towards the interior of the vehicle. In another example, the computing system can detect that an object has been placed in or removed from a compartment or the interior of the vehicle based on weight information from a set of weighing devices that are positioned within the compartment or the interior of the vehicle. The set of weighing devices can be positioned in the vehicle such that the respective measuring platform of the set of weighing devices is positioned on, positioned below, or included with a bottom surface of the respective compartment or interior of the vehicle.

In another example, the computing system can detect that a mobile computing device with wireless communications has been placed in or removed from the vehicle based on if that mobile computing device is communicating with antennas in the vehicle that use wireless protocols such as Bluetooth or Wi-Fi. In another example, if the mobile computing device has its own location sensors, the computing system can compare the output of those location sensors to the output of location sensors on the vehicle to determine if the mobile computing device is moving with the vehicle, and is therefore likely to be inside the vehicle. Still further, in another example, the computing system can detect that an object has been placed in or removed from the compartment or the interior of the vehicle based on compression information from a set of suspension sensors that are positioned proximate to or included in a suspension system of the vehicle.

If the computing system detects that an object has been placed within the vehicle as part of or during the performance of the on-demand service, and subsequently detects, at the time the service is being completed or after the service has been completed, that the object is still present in the vehicle, the computing system can automatically perform a remedial action, such as communicating a message to a computing device associated with the user that requested the service and/or notifying the service arrangement system that the object is still present in the vehicle. According to some examples, the computing system can also instruct the driver or cause the vehicle to remain stationary at a location of the vehicle when the object was detected to still be present in the vehicle for at least a predetermined duration of time. In another example, the computing system can instruct the driver or cause the vehicle to travel to a predetermined or specific location where the object can be removed from the vehicle.

According to an example, the computing system can also use sensor data to identify what the object is or what type of object has been placed in the vehicle. Still further, in some examples, the computing system can also use the detection of an object being placed in the vehicle and/or the detection of the object being removed from the vehicle to determine (or as part of determining) when the service has started and/or ended.

As used herein, a client device, a driver device, and/or a mobile computing device refer to devices corresponding to desktop computers, cellular devices or smartphones, personal digital assistants (PDAs), laptop computers, tablet devices, etc., that can provide network connectivity and processing resources for communicating with a remote computing system(s) over one or more networks, such as a service arrangement system. A remote computing system can refer to one or more computing systems or servers that is remote from the client device, the driver device, and/or the vehicle (e.g., corresponds to the back-end server system of the network service). Still further, in examples described herein, a driver device or a computing system associated with a vehicle can also correspond to custom hardware of the vehicle, such as an in-vehicle or on-board computing system, that has network connectivity and location-determination capabilities.

Still further, examples described herein relate to a variety of location-based (and/or on-demand) services, such as a transport service, a food truck service, a delivery service, an entertainment service, etc. to be arranged between users and service providers. In other examples, a service arrangement system can be implemented by any entity that provides goods or services for purchase through the use of computing devices and network(s). For purpose of simplicity, in examples described herein, the service arrangement system can correspond to a transport arrangement system that arranges transport services to be provided for riders/users by drivers or vehicles (e.g., transporting objects or people).

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system to detect objects within a vehicle in connection with a transport service. Depending on implementation, such a system can be implemented by and operated on a mobile computing device of a driver, an in-vehicle computing system of a vehicle, or a service arrangement system that provides a network service. For purpose of simplicity, in the example of FIG. 1, the system 100 is described as being implemented by and operated on an in-vehicle computing system of a vehicle, such as an AV, through execution of instructions stored in one or more memory resources of the in-vehicle computing system. As described herein, the system 100 can include, be a part of, or correspond to an application or an operating system of the in-vehicle computing system that communicates with a service arrangement system 190 over one or more networks.

According to examples, the system 100 can include a system manage 110, a location determination 120, an object detection 130, a location database 140, a trip database 150, and a service interface 160. For purpose of simplicity, other components of the system 100, such as a user interface component, other databases, device interfaces to communicate with device components, etc., are not illustrated in FIG. 1. The components of the system 100 can combine to detect objects that are placed within and/or removed from a vehicle in connection with transport services. Logic can be implemented with various applications (e.g., software) and/or with hardware of the computing system that implements the system 100.

In one example, the system 100 can communicate with the service arrangement system 190 via the service interface 160. As described herein, the service arrangement system 190 can communicate with a plurality of service providers (e.g., driver devices and/or in-vehicle computing systems) and a plurality of client (or user) devices in order to arrange transport services between users and service providers. The service arrangement system 190 can be implemented on network side resources, such as on one or more servers or data centers, or implemented through other computer systems in alternative architectures (e.g., peer-to-peer networks, etc.). Typically, a user can operate a client or user device (not shown in FIG. 1 for simplicity) to communicate with the service arrangement system 190 over a network(s) and make a request for a transport service at a specified location (e.g., a pickup location of the package or a person to be transported). In some examples, the user device can run a designated service application that communicates with the service arrangement system 190. The service arrangement system 190 can receive the request and programmatically select a service provider to provide the transport service.

Depending on implementation, if the service arrangement system 190 selects a human driver to provide the service, the service arrangement system 190 can transmit an invitation to the selected driver's device, thereby providing the driver with an option to accept or reject the invitation to provide the transport service for the requesting rider. In another example, if the service arrangement system 190 selects an AV from a plurality of available AVs (and/or human drivers) to provide the service, such as described in FIG. 1, the service arrangement system 190 can transmit information about the service (referred to as service instructions 191) to the system 100 via the service interface 160.

According to examples, the service interface 160 enables the system 100 to exchange data between the system 100 and the service arrangement system 190. For example, the service interface 160 can use one or more network resources of the in-vehicle computing system to exchange communications over one or more wireless networks (e.g., a cellular transceiver, a WLAN transceiver, etc.). The service interface 160 can include or use an application programming interface (API), such as an externally facing API, to communicate data with the service arrangement system 190. The externally facing API can provide access to the service arrangement system 190 via secure access channels over the network through any number of methods, such as web-based forms, programmatic access via restful APIs, Simple Object Access Protocol (SOAP), remote procedure call (RPC), scripting access, etc.

In the example of FIG. 1, the service arrangement system 190 has processed a request for a transport service by a user and has selected the AV that implements the system 100 to provide the transport service for the requesting user. The service arrangement system 190 may have determined, based on the pickup location specified by the requesting user and the current locations (or most recently determined locations) of available service providers nearby the pickup location (e.g., within a predetermined distance of the pickup location), that the AV implementing the system 100 is to provide the transport service. The service arrangement system 190 can transmit service instructions 191 about the transport service to instruct the vehicle about where to go and/or what to do. In some examples, the service instructions 191 can include user information 192 (e.g., a user identifier, contact information of the user, a user's rating, etc.), pickup location 193 specified by the user (e.g., an address, a landmark, a location data point corresponding to a latitude and longitude coordinate), destination location 194, and/or other information, such as the type of transport service (e.g., transport a person, deliver a package, etc.) or details about the number of people or number of packages. The service instructions 191 can, in one example, cause the vehicle controlling component(s) of the AV to control, at least in part, the AV to travel to the appropriate locations. In other words, the vehicle control component(s) can use some or all of the service instructions 191 (in addition to other information) to control the vehicle to move to the pickup location and/or the destination or drop off location.

The system manage 110 can receive the service instructions 191 and in response, can perform a plurality of operations on behalf of the system 100. For example, the system manage 110 can process the service instructions 191 by determining information about the transport service it is to perform, and can initiate the performance of the transport service by determining the route(s) to travel to the pickup location and/or the destination location and controlling the AV to travel to the pickup location and/or the destination location.

In one example, a trip manage component of the system manage 110 can create a trip entry 151 for the transport service using some or all of the information from the service instructions 191 and store the trip entry 151 in a trip database 150 of the system 100. The trip manage component can then update the trip entry 151 with information about the vehicle's location as the vehicle performs the transport service (e.g., travels to the pickup location from the current location, picks up the user or an object, travels to the drop off location, etc.). The trip manage component can also record, in the trip entry 151, the time and the location of the vehicle when the service instructions 191 were received, when the service started, and when the service ended. The trip entry 151 can be used by the system 100 and/or the service arrangement system 190 to determine the cost for the transport service for the requesting user (e.g., after completion) and for maintaining a historical record of the AV and/or the requesting user.

The location determination 120 can provide the system manage 110 with information about the vehicle's location by receiving location data points 121 (e.g., periodically) from one or more geo-aware resources of the in-vehicle computing system. For example, the location determination 120 can periodically determine the current location of the vehicle by communicating with, e.g., via a device interface, the GPS receiver of the driver device, one or more other sensors, and/or one or more transceivers (e.g., cellular transceiver, Wi-Fi transceiver) for purpose of determining the current location data point 121 of the vehicle. In one example, the location determination 120 can make a call to the GPS receiver periodically, such as every two seconds or four seconds, etc., to periodically receive a current location data point 121 of the driver device. The location determination 120 can also determine the associated timestamp of each determined location data point 121 of the vehicle. Depending on implementation, the location determination 120 can receive a timestamp (and/or an error value) along with the location data point 121 of the vehicle from the GPS receiver or can determine the timestamp of the location data point 121 using a separate clock (e.g., an internal clock of the driver device). The system manage 110 can store the location data points 121 in the location database 140 and/or the trip entry 151 to maintain data about where the vehicle traveled in connection with transport services. As an addition or an alternative, the location determination 120 can store the location data points 121 of the vehicle in the location database 140.

Referring back to the system manage 110, the trip manage component can also use the location data points 121 from the location determination 120 to monitor the vehicle. The trip manage component can determine the position and the state of the vehicle or system 100 in connection with the performance of the transport service (e.g., what stage of the transport service the vehicle is at). For example, the state of the system 100 may previously have been in an available state, which corresponds to a state in which the vehicle can be assigned the transport service from the service arrangement system 190. When the system 100 receives the service instructions 191, the trip manage component can place the system 100 in a different state, e.g., on route state, which corresponds to the vehicle traveling to the pickup location. Similarly, each time the trip manage component determines that the transport service has initiated or ended, the trip manage component can place the system 100 in a respective state (e.g., change from the on route state to the on trip state, or change from the on trip state to completed or available state, respectively). The trip manage component can store information about the state and/or when the state change occurred along with the corresponding location data points 121 in the trip entry 151 of the transport service.

Still further, as an addition or an alternative, the service arrangement system 190 can locally generate and store its own trip entry that corresponds to or is similar to the trip entry 151 stored in the system 100. The trip manage component can periodically provide the above-described information about the transport service to the service arrangement system 190, e.g., via the state information 111 and/or the location data points 113. The service arrangement system 190 can use the received information from the system 100 to provide updated information about the transport service to the requesting user (e.g., the location of the AV and/or the current state of the AV, etc.). In addition, the service arrangement system 190 can determine, from the state information 111 and/or the location data points 113, when the transport service has initiated or completed and/or when the AV is available to provide another transport service.

In addition to creating and updating a trip entry 151 for the transport service, the system manage 110 can initiate the performance of the transport service based, at least in part, on the service instructions 191. According to some examples, a vehicle control component of the system manage 110 can control the AV to perform the transport service. Depending on implementation, the vehicle control component can interface with the AV control system or can correspond to the AV control system. As described herein, an AV includes (i) computing resources that implement the system 100 and/or the AV control system, (ii) other sub-components or sub-subsystems to control various other operations or parts of the AV, and (iii) a plurality of vehicle parts. For purpose of simplicity, not all parts of an AV are discussed herein.

According to examples, various parts of an AV can include, but are not limited to, a frame or a chassis, a body (e.g., including doors, bumpers, windows, a cab, seats, a trunk space, etc.), tires, a suspension system, a braking system, a steering system, an electrical system (e.g., including batteries, wires, cables, alarm sub-system, etc.), a transmission system (e.g., including a drive train, engine, etc.), a fuel system, an exhaust system, a cooling system, and an AV control system. The AV can also include electronic control units (ECUs), which include controllers and/or microcontrollers, and other electronic components that can control the various systems or sub-systems of the AV, such as a door control unit, an engine control unit, a speed control unit, a transmission control unit, etc. The AV control system can be programmed, through execution of instructions stored in memory by one or more processors, to control the AV by sending control signals and by receiving data (e.g., feedback or sensor data) from the various systems and vehicle parts. For purposes of this application, the AV control system can be instructed to control the AV so that it can safely navigate roads and streets to move from one location to another in connection with transport services.

Still further, the AV can include a location determination module or resources, such as a GPS receiver and/or wireless transceivers, to determine the location of the AV relative to other objects or in reference to a coordinate system. The AV can also include a plurality of sensors, such as a set of cameras, a set of stereo cameras, a set of radars, a set of LIDAR sensors, etc. to enable the AV to detect the real-time environment of the AV. One or more (or all) of these sensors can be positioned on the exterior of the vehicle (e.g., on the front, rear, roof of the vehicle, etc.) to detect information about the environment around the AV, such as the position of the vehicle relative to roads, building, other vehicles, etc., or the position of inanimate objects. For example, in order for the AV to travel from a current position or location (e.g., determined from the GPS receiver as a location data point 121) to a specified location (e.g., the pickup location 193 and/or destination location 194 indicated in the service instructions 191), the AV control system can access a stored detailed spatial map(s) of the region it is in (e.g., including map data 112) and determine the route(s) to travel to the specified location. Based on the detected environment surrounding the AV (from data periodically and continuously detected by the set of sensors), the AV control system can periodically perform decision making operations that instruct the AV to take a certain action(s) to move to the specified location. As a result of each decision making operation, the AV control system can determine that it is to travel in a certain direction at a certain speed at one instance in time, for example, and at a next instance in time, can determine that it is to decelerate to a certain speed, change bearings/directions slightly, or change lanes, etc. The AV control system can provide control signals to the various vehicle components/systems accordingly.

In one example, when the AV travels to the pickup location to initiate the transport service, the system 100 can periodically determine whether the AV has reached the specified pickup location (e.g., start location). In other words, the system 100 can periodically check when the AV arrives at or is within a predetermined distance (or is within a predetermined estimated travel time) from the pickup location. For example, the trip manage component can periodically compare the current location (e.g., the latest location data point 121 provided by the location determination 120) with the pickup location 193 and determine whether the AV is within the predetermined distance or estimated travel time. When the trip manage component determines that the AV is within the predetermined distance or estimated travel time, the trip manage component can change the state of the system 100 from the on route state to the arriving/has arrived state. The state information 111 about this change can be transmitted to the service arrangement system 190 so that the service arrangement system 190 can provide updated information about the AV to the requesting user's device.

In addition, according to an example of FIG. 1, the system 100 can also determine whether an object(s) has been placed in the vehicle in connection with the transport service. In some instances, a driver or an AV control system may need to determine if a requesting user has placed an object in the vehicle while being transported (e.g., luggage, boxes, groceries) or determine if the object has been placed in the vehicle for a delivery transport service. As described herein, an object can correspond to an item(s) or a person(s) that is placed within or enters a vehicle. The object detection 130 can communicate with one or more sets of sensors or one or more combinations of sensors of the AV, via one or more vehicle or sensor interfaces, to receive sensor data 131, and based on the sensor data 131, can determine whether an object has been placed in (or removed from) the AV (referred to herein as an object detection process or operation). In one example, the object detection 130 can transmit a set of control signals to the sensors to cause (or trigger) the sensors to provide the sensor data 131. Such sensors can include a set of cameras, a set of weighing devices, a set of suspension sensors, a set of light detection and ranging (LIDAR) sensors, a set of radio-frequency antennas and/or transceivers, and/or a set of ultrasound sensors that are positioned in or provided with the vehicle to detect the presence of, the position of, and/or the weight of one or more objects.

In some examples, the object detection 130 can perform an object detection process by (i) receiving sensor data 131 from one or more sensors, (ii) processing the received sensor data 131 using other information (e.g., models or previously stored data), and (iii) determining whether an object has been placed in the AV (when it was previously not in the AV) or determining whether an object has been removed from the AV (when it was previously in the AV). For example, the object detection 130 can receive image information from one or more cameras positioned within a trunk of the AV (e.g., with the lens facing the inside of the trunk), and process the image information by using image processing or image recognition processes and/or by comparing the image information to previously stored baseline image information about the trunk (e.g., showing the image of the trunk when it was empty or the image of the trunk before receiving the service instructions 191). The stored baseline image information can be a predefined image or can be an image captured by the one or more cameras at a time before the AV arrived at or near the pickup location 193. Still further, in one example, the object detection 130 can use image processing (as well as other stored or received data from the service arrangement system 190) to identify what the object is based on visual characteristics of the object in the image.

In other examples, when one or more other sensors are used for detecting the presence or position of an object, the object detection 130 can use other baseline or model information as a basis for comparison with received sensor data 131. For example, the object detection 130 can receive sensor data 131 from one or more weighing devices or sensors that are positioned in a compartment of the AV such that its respective measuring platform is on, positioned below, or included with a bottom surface of such compartment. The object detection 130 can determine a change in the measurements from the sensor data 131 at a time before the AV arrived at or near the pickup location 193 and after the service has started.

Depending on implementation, the object detection 130 can perform the object detection process at various times. For example, the object detection 130 can concurrently perform the object detection process as the AV travels to the pickup location 193 and/or as the trip manage component determines whether the AV is within the predetermined distance or predetermined estimated travel time of the pickup location 193. The object detection 130 can make calls to the set of sensors to receive sensor data 131 periodically. In another example, the object detection 130 can perform the object detection process at various instances when instructed or triggered by the system manage 110 (via trigger 115). For example, when the trip manage component determines that the AV is within the predetermined distance or predetermined estimated travel time of the pickup location 193, the trip manage component can transmit a trigger 115 to cause the object detection 130 to perform the object detection process. Still further, as another variation, the trip manage component can transmit the trigger 115 when it determines that the AV is stationary for a predetermined duration of time and/or when it determines that the AV is stationary for a predetermined duration of time while it the AV is within the predetermined distance or predetermined estimated travel time of the pickup location 193. As another example, the object detection 130 can be triggered to perform the object detection process when the trip manage component determines that the transport service has started. By causing the object detection 130 to perform the object detection process at select times, the system 100 can reduce excessive consumption of energy and computing resources by causing the sensor(s) to wake up (from a suspended or sleep state) and detect or perform a measurement only when necessary.

If the object detection 130 detects the position of an object or detects that an object has been placed within the vehicle based on a first set of sensor data 131, the object detection 130 can provide object information 133 to the system manage 110. The object information 133 can indicate to the system manage 110 that an object has been placed in the AV (e.g., a message, or a binary bit can be toggled) and/or can include information about that object based on the types of sensor(s) that is used by the AV to perform the detection. For example, the additional information can include (i) what the object is (e.g., a box, a bag, a skateboard, etc.), (ii) one or more images of the object captured by the set of cameras, if cameras are used, (iii) measurements pertaining to the object (e.g., a weight, if weighing devices or suspension sensors are used, or dimensions of the object, if cameras, LIDAR sensors or ultrasound sensors are used, etc.), and/or (iv) where the object is located (e.g., what compartment, or the position of the object). The trip manage component can store some or all of the object information 133 with the trip entry 151 associated with the transport service, so that information about the object can be logged and associated with the particular user.

As described, concurrently (or before or after) the object detection 130 detects an object, the trip manage component can determine that the transport service has begun. In some examples, the system manage 110 can determine that the transport service has started, based, at least in part, on detecting that an object has been placed in the vehicle. The transport service can correspond to transporting a person (and/or the person's things) from one location to another, or transporting an object for delivery from one location to another. The object detection 130 can detect, from one or more sensors, such as a camera or weighing devices, if a person and/or objects have entered the vehicle or if an object (without the person) has been placed in the vehicle. In this example, the set of cameras (or LIDAR sensors or ultrasound sensors) can be positioned inside the cab/interior of the vehicle to enable the object detection 130 to detect that the person has entered the vehicle using image information from the camera(s) and processing the image(s). As an addition or an alternative, a set of weighing devices or a set of suspension sensors that is positioned proximate to or included in a suspension system of the AV can determine that an amount of mass has been added to the vehicle.

Once the transport service has started, the trip manage component can store information about the performance of the transport service (e.g., the time and/or the location of travel of the AV), including the start time and start location of the transport service, in the trip entry 151. As the AV travels to the destination location 194 of the transport service, the trip manage component can also use the location data points 121 to determine when the AV approaches and has approached the destination location 194, for purpose of determined, at least in part, that the transport service has completed.

In one example, in instances when the object detection 130 previously detected an object in connection with the transport service (e.g., the rider placed a bag in the trunk of the AV), the trip manage component can cause the object detection 130 to also detect whether the object has been removed from the vehicle. The object detection 130 can detect whether the object has been removed from the vehicle at different times, depending on variations. According to one example, the system manage 110 can cause the object detection 130 to concurrently perform the object detection process as the AV travels to the destination location 194 (e.g., periodically), or perform the object detection process when the trip management component determines that the AV is within a predetermined distance or predetermined estimated travel time of the destination location 194. As an addition or an alternative, the trip manage component can cause the object detection 130 to perform the object detection process when the trip manage component determines that the AV is stationary for a predetermined duration of time, when the trip manage component determines that the AV is stationary for a predetermined duration of time while it the AV is within the predetermined distance or predetermined estimated travel time of the destination location 194, or in response to determining that the transport service has been completed.

When the trip manage component determines that the transport service has been completed, for example, the object detection 130 can perform the object detection process to determine if the object has been removed using sensor data 131 received from the set of sensors (e.g., a second set of sensor data 131). If the object detection 130 detects that the object is still present, it can provide information to the system manage 110 indicating that the object is still present in the vehicle. In response, the system manage 110 can automatically perform a remedial action. On the other hand, if the object detection 130 detects that the object has been removed, no remedial process or action is taken. In one variation, if the system 100 detects that the object has been removed (e.g., in the case of a delivery transport service), the system 100 can determine that the delivery transport service has been completed.

As described herein, a remedial action can correspond to an operation (or set of operations) the system 100 performs to return whatever object is accidentally left behind to the user or to make it easier for the user to retrieve the object. In various implementations, the remedial action(s) can be performed by the system 100 and/or performed by the system 100 in connection with the service arrangement system 190. In the latter example, the remedial action(s) can be performed as a result of the exchange of data between the system 100 and the service arrangement system 190.

In one example, the system manage 110 can receive information that the object is still remaining in the vehicle and/or information about the object itself (e.g., based on recently determined information about the object, or from object information 133 previously received when the object was previously detected) and can generate an object message 117 based on such information. The object message 117 can include, for example, a time and/or a location when the transport service was completed, an identifier of the AV, an identifier of the user, an identifier of the transport service, and information about the object (e.g., what the object is, one or more images of the object, measurements pertaining to the object, where the object is located). The system manage 110 can determine a communication identifier for the user (e.g., a phone number or email address of the user or temporarily associated with the user's account), and transmit the object message 117 to the user's computing device. Such an object message 117 can also include notification information to cause the user's computing device to display content to inform the user that the object has been left behind in the AV and/or to contact the entity that provides the service arrangement system 190 (e.g., via the designated application running on the user's computing device). As an addition or an alternative, an object message 117 can be transmitted to the service arrangement system 190, which can then transmit a message, including notification information, to the user's computing device. The notification information displayed to the user can provide information about the object and/or how the user can retrieve the object. Examples of different notification information is illustrated in FIGS. 4A through 4D.

As an addition or an alternative, the system manage 110 can also perform one or more remedial actions by positioning the AV at a particular location (e.g., by causing the AV to move to a particular location or keeping stationary at a particular location). For example, when a remedial action is to be performed, the system manage 110 can access stored positioning instructions that instruct the vehicle control component to control, via the vehicle components, the AV to remain stationary at (i) the destination location 194, or (ii) the location of the vehicle when the object detection 130 determined that the object was still present in the vehicle. By causing the AV to remain stationary at a specified location, the object message 117 can inform the user that the user's object has been left behind in the AV, and that the AV will remain at the specified location for a predetermined duration of time (e.g., two minutes). Alternatively, the stored positioning instructions can instruct the vehicle control component to cause the AV to travel to a specified location (e.g., a storage location or office building where lost objects are stored), and the object message 117 can inform the user that the object can be retrieved at the specified location during certain times.

In some examples where the AV travels to a specified location, such as a storage location or a disposal location, the AV can use automatically-controlled actuators to remove the object from the AV for storage or disposal. For example, the AV itself can include one or more actuators coupled to one or more mechanical hands in the vehicle's interior or trunk that can grab an object and remove it. In another example, the AV can move to a specified lane or spot at the storage or disposal location, open the vehicle doors and/or trunk, and an automatically-controlled mechanical arm and hand or claw can remove the object from the vehicle.

Still further, in another example, the system manage 110 can provide information to the service arrangement system 190 indicating that an object has been left behind, and in response, the service arrangement system 190 can transmit instructions to the system 100 to cause the AV to perform one or more tasks. In one implementation, the service arrangement system 190 can transmit vehicle instructions to the system manage 110 that causes the vehicle control component to control the movement and operation of the AV. The vehicle instructions can cause the AV to move to a specified location or remain stationary at a specified location.

In some instances, after dropping off the user at the destination location 194, the AV may be arranged/selected to provide a transport service to another requesting user. As a result, the system 100 may perform the remedial action, such as transmitting the object message 117, but also cause the AV to travel to the pickup location specified by the subsequent requesting user. In some examples, the service arrangement system 190 (or the system 100) can transmit a message to the user's computing device, which queries the user for an response input to (i) instruct the disposal of the object, (ii) ask the entity that operates the service arrangement system 190 to hold on to the object on behalf of the user for a duration of time, (iii) request a transport service to a specified location where the object is held, or (iv) request a delivery of the object to the user's current location (or specified location). One or more of these options can be associated with an extra cost for the user. The service arrangement system 190 can receive the user input, via the application on the user's computing device, and can process the response accordingly. For example, if the user provides an input to receive the delivery of the object at the user's current location, the service arrangement system 190 can process the response as a delivery transport service request, identify the previous AV that the object is located in, and schedule that particular AV to travel to the user's current location (e.g., before, while, or after completing the subsequent transport service for the subsequent requesting user). In this example, the user can be charged for the delivery as a separate transport service in its entirety or as part of the user's previous transport service (e.g., as a surcharge).

While the system 100 of FIG. 1 is described as being implemented on computing and memory resources of an autonomous vehicle, in some examples, the system 100 can be implemented on a mobile computing device operated by a driver of a vehicle (e.g., a driver device). For example, the system 100 can be implemented as an application or program (or as part of an application) that runs on the driver device, and that communicates data with the service arrangement system 190 over one or more networks. In such examples, the system 100 can include other components, such as a user interface component that generates and presents content (e.g., graphic user interfaces) on the display of the driver device. When the driver is selected by the service arrangement system 190 to provide a transport service for a requesting user, as opposed to receiving service instructions 191, the system 100 can receive and display an invitation to provide the transport service via the user interface component, and the driver can either accept or reject the invitation. The invitation can include the user information 192, the pickup location 193, and/or the destination location 194.

Still further, in examples where the system 100 is implemented by the driver device, the object detection 130 can receive sensor data 131 via a communication interface of the driver device, such as a short-range wireless communication transceiver (e.g., Bluetooth or Wi-Fi) or a physical connector port. The driver can fix or attach, in the trunk or in the backseat of the vehicle, etc., one or more sensors which can communicate sensor data 131 to the object detection 130 via the communication interface.

As an alternative, one or more components of the system 100 can be implemented as part of the service arrangement system 190 or as part of another remote system (e.g., remote from the autonomous vehicle or the driver device) that communicates with the service arrangement system 190. For example, the system 100 can transmit sensor data 131 to an object detection 130 that is implemented in the service arrangement system 190, which then detects when an object has been placed in a vehicle and/or has been taken out of the vehicle. The service arrangement system 190 can then perform the remedial actions, such as transmitting notifications to the user, based on the detection.

Still further, in some examples, other sensors can be used by the system 100 to detect a presence and/or removal of an object from a vehicle. For example, electromagnetic sensors can be used to detect electronic products, such as cell phones, tablets, laptop computers, etc., or other advanced sensors, such as chemosensors or gas chromatography sensors can be used to detect objects using smell (e.g., food, groceries, etc.). In one example, using electromagnetic sensors or antennas/wireless transceivers can be helpful to detect small electronic devices that may be hard to detect in the vehicle, e.g., may have fallen or slipped between the seats or under the seat.

In a different application, the system 100 can also use the sensor data to detect whether there has been damage to the interior of the vehicle as a result of the requesting user riding in the vehicle and/or transporting an object of the user. The system 100 can detect the state of the vehicle's interior at a time before the transport service is initiated (e.g., in response to when the service instructions are received or at a predetermined distance or estimated time away from the pickup location of the user) using sensors that are positioned in the interior of the vehicle. At a time the transport service is being completed (e.g., the vehicle is close to or has arrived at the destination location) or has completed, the system 100 can again detect the state of the vehicle's interior at this time, and compare the information with the previous information about the state of the vehicle's interior. Using this comparison, the system 100 can detect whether something has spilled on the seats or the floor, whether the seats have been ripped or scratched, etc., after the transport service. If damage is detected, the system 100 can provide information indicating the damage to the service arrangement system 190 and/or to the user device. The service arrangement system 190 can charge the user and/or instruct the driver or cause the vehicle to travel to a specified location for clean-up and/or repair.

Methodology

Figure 2:
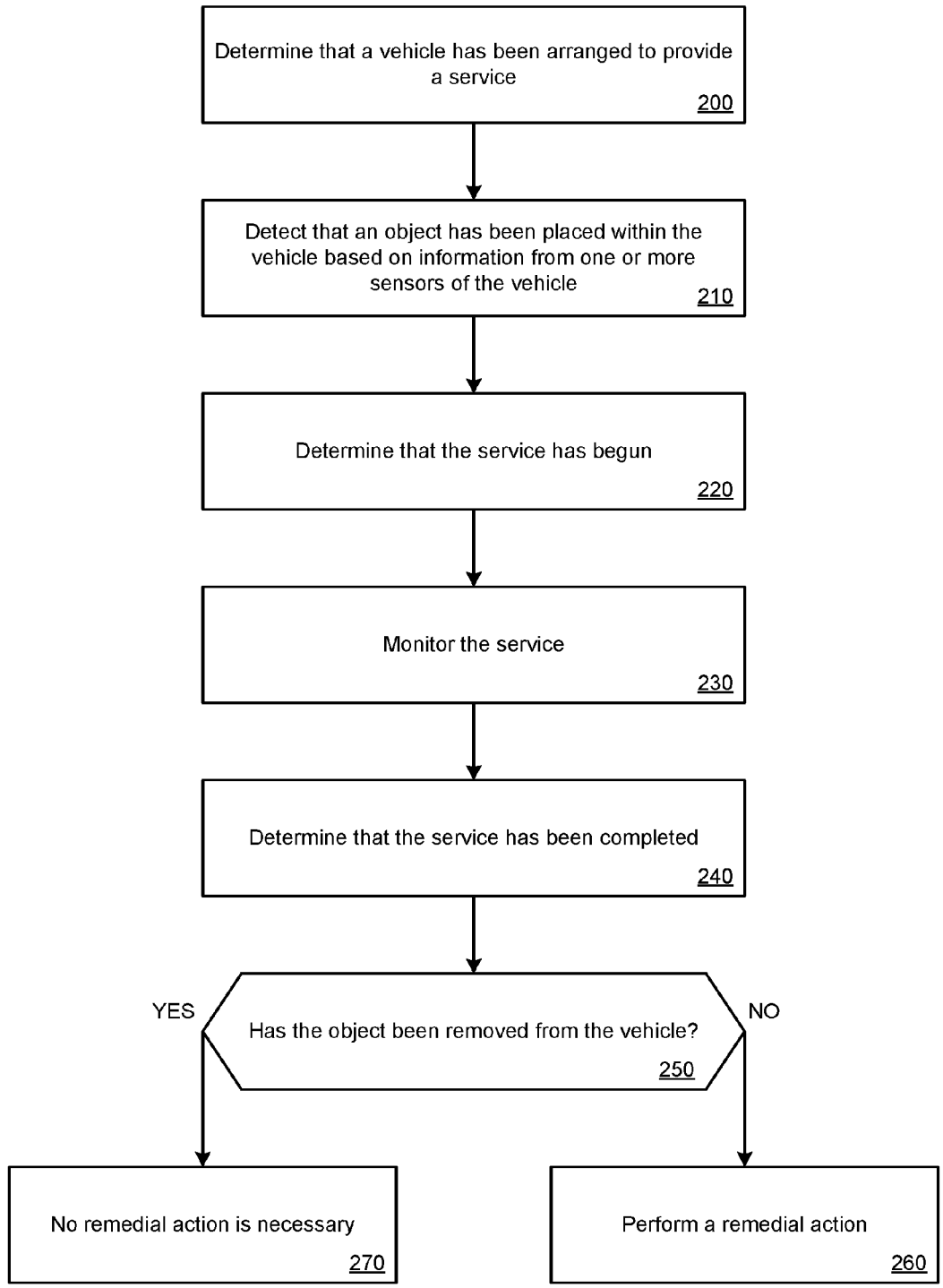
FIG. 2 illustrates an example method for detecting objects within a vehicle in connection with a transport service.
Figure 3:
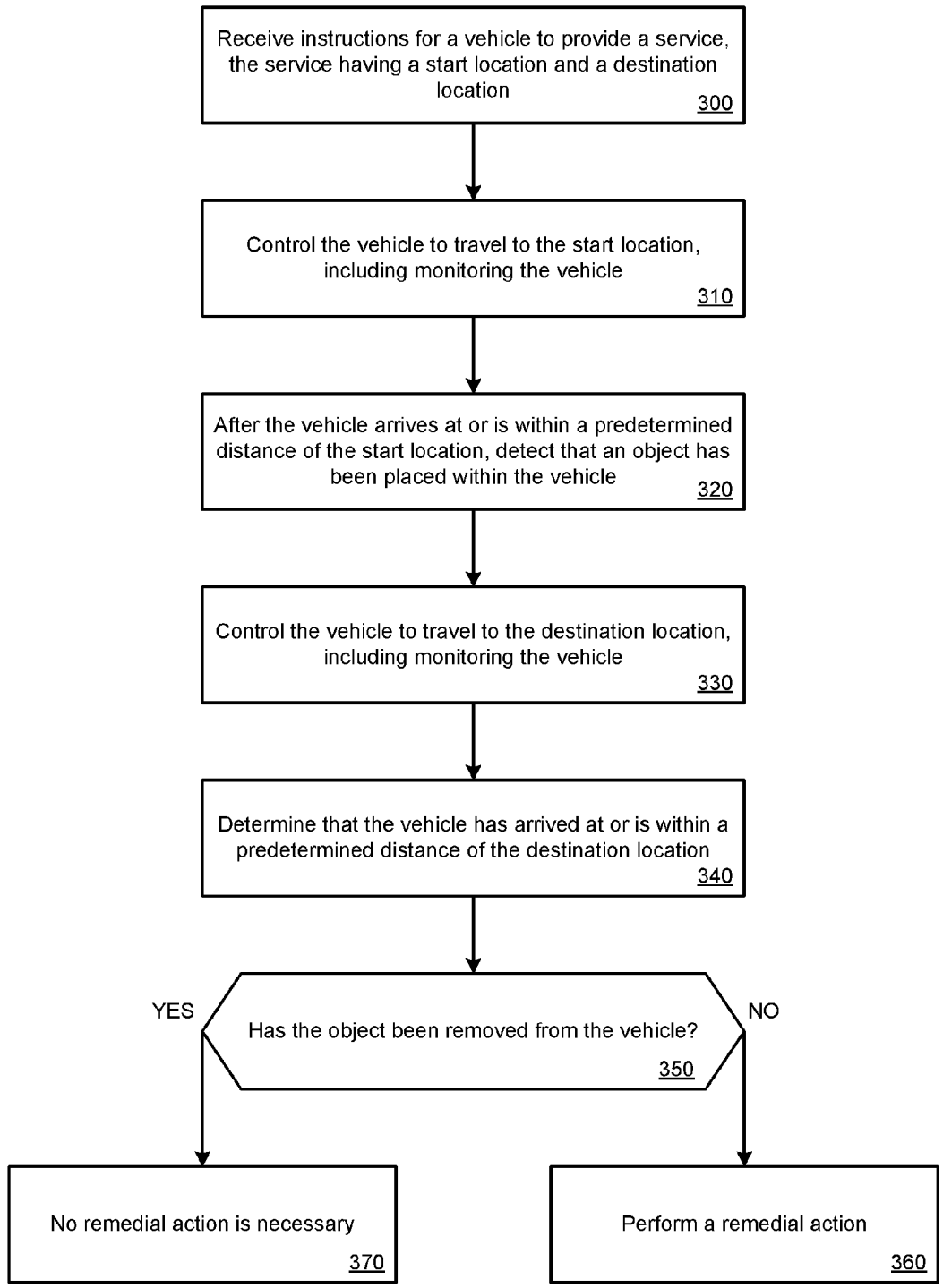
FIG. 3 illustrates another example method for detecting objects within a vehicle in connection with a transport service.

FIGS. 2 and 3 illustrate example methods for detecting objects within a vehicle in connection with a transport service. Methods such as described by examples of FIGS. 2 and 3 can be implemented using, for example, components described with an example of FIG. 1. Accordingly, references made to elements of FIG. 1 are for purposes of illustrating a suitable element or component for performing a step or sub-step being described. For purpose of simplicity, the example method of FIG. 2 is described as being performed by the service arrangement system 190 and/or the system 100 operating on a driver device.

Referring to FIG. 2, the service arrangement system 190 can determine that a driver of a vehicle or an AV been selected to provide a service for a requesting user (200). For example, the service arrangement system 190 can perform a vehicle selection process to select the vehicle based on the location of the vehicle and the service location(s) specified by the requesting user. The service can correspond to an object or item delivery transport service from a pickup location to a destination location, or a transport service of a person (e.g., the user) from a pickup location to a destination location. The service arrangement system 190 can transmit, to the respective system 100 of the selected vehicle, service instructions corresponding to the service that the driver or the AV is to perform. In the example of an AV, the system 100 can process the service instructions to control the AV to travel from the current location to the pickup location, while in the example of a human driver, the system 100 can provide route or navigation information that the driver can follow to move to the pickup location.

At a time after the system 100 determines that the driver or the AV is to provide the service, the system 100 can perform an object detection operation using data from one or more sensors of the vehicle. In one example, the service arrangement system 190 can receive a first set of sensor information from the system 100 (e.g., at a first time) and can detect that an object has been placed within the vehicle based on the first set of information (210). The system 100 can receive the sensor information from a set of sensors of the vehicle. Alternatively, the system 100 can detect that the object has been placed within the vehicle and provide information indicating such object to the service arrangement system 190.

Depending on implementation, one or more sensors or combination of sensors can be used by the system 100 and/or the service arrangement system 190 to detect that an object has been placed in the vehicle. For example, the system 100 and/or the service arrangement system 190 can receive image information from a set of cameras (or radars, LIDARs, or ultrasound sensors) that are positioned within the vehicle, where the set of cameras are positioned such that the respective lens of the set of cameras faces towards an interior of the vehicle (e.g., the back seat, the front seat, the trunk, or other compartment). In another example, the system 100 and/or the service arrangement system 190 can receive weight information from a set of weighing devices that are positioned within a compartment or the interior of the vehicle, where the set of weighing devices are positioned such that the respective measuring platform of the set of weighing devices is positioned on, positioned below, or included with a bottom surface of the compartment or the interior of the vehicle (e.g., the platform is at the surface of the trunk to weigh objects that are placed in the trunk or at or in a seat to weigh a person that sits in the back set or front seat). Still further, in another example, the system 100 and/or the service arrangement system 190 can receive compression information from a set of suspension sensors that is positioned proximate to or included in a suspension system of the vehicle (e.g., near the rear and/or front suspension system or frame of the vehicle). Additionally, a sensor can also provide information whether a compartment or trunk has been opened and/or closed, which can be used in connection with other sensor information.

The system 100 and/or the service arrangement system 190 can use information from one or more of these different sources to perform the object detection operation. In addition, based on the first set of received sensor input/information, the system 100 and/or the service arrangement system 190 can detect that the object has been placed in the vehicle, what the object is (or type of object), the color or size or dimension or weight of the object, what compartment the object is in, and/or the position of the object. According to an example, the service arrangement system 190 can also associate the object information with the trip entry of the transport service (and/or with the user's profile or account).

In various examples, the system 100 can trigger the sensors to determine sensor data (e.g., perform detection or measurement) based on location information of the AV. For example, in order to conserve energy or power, the system 100 can trigger the sensors to determine sensor data when the AV arrives at or close to a service location, e.g., arrives at or within a predetermined distance or estimated travel time of the pickup location, and/or when the AV is stationary for a duration of time while at or close to the service location. Alternatively, in another example, the system 100 can trigger the sensors to determine sensor data in response to determining that the service has begun.

Referring back to FIG. 2, the service arrangement system 190 can also determine that the service has begun (220). Depending on implementation, the service arrangement system 190 can determine that the service has begun (i) in response to detecting that the user has entered the vehicle (e.g., in response to detecting the object in the vehicle in step 210, or based on location data points of the user's computing device and the location data points of the vehicle, and determining that they are within a predetermined distance of each other), (ii) in response to detecting that a predetermined duration of time has elapsed (e.g., ten seconds) since detecting that the user has entered the vehicle, (iii) in response to receiving, from the user's computing device, information indicating that the service can begin as a result of an input being provided at the computing device associated with the user (e.g., the user selects a feature corresponding to starting the trip), (iv) in response to receiving, from driver device (or the on-board computing system of the AV), information indicating that the service can begin as a result of an input being provided at the driver device or the on-board computing system from the driver or the user, and/or (v) in response to determining that the vehicle has been positioned within a predetermined distance of the start location for a predetermined duration of time based on location information of the vehicle. In other examples, the system 100 detects that the service has begun based on any of the examples (i) through (v).

The service arrangement system 190 also monitors the service, for example, as the driver or the AV performs the service (230). As described herein, monitoring the service can include periodically determining the location (and corresponding timestamp) and/or state of the vehicle as it travels from the pickup location to the destination location, and storing such information in the trip entry associated with the service. The system 100 can provide such information to the service arrangement system 190. In some examples, the service arrangement system 190 can also provide the information about the progress of the service to the user's computing device (or to another device). For example, the user may have requested a delivery service for a package to be picked up at the user's location and dropped off at a destination location for a friend. The application on the user's device can receive (periodically) information about the progress of the service, e.g., the AV's location and movement on a map, from the service arrangement system 190. As an addition or an alternative, the user may have provided, to the service arrangement system 190 via the application, the contact information (e.g., phone number or email address) of the friend who is to receive the package. The service arrangement system 190 can monitor the service and provide updated information about the service to the friend, so that the friend can track the package as the AV travels to the destination location.

The service arrangement system 190 can determine that the service has been completed, e.g., as a result of monitoring the service (240). Depending on implementation, the service arrangement system 190 can determine that the service has completed (i) in response to detecting that the user has left the vehicle (e.g., based on location data points of the user's computing device and the location data points of the vehicle, and determining that they are separated by more than a predetermined distance), (ii) in response to detecting that a predetermined duration of time has elapsed (e.g., twenty seconds) since detecting that the user has left the vehicle, (iii) in response to receiving, from the user's computing device, information indicating that the service has completed as a result of an input being provided at the computing device associated with the user (e.g., the user selects a feature corresponding to ending the trip), (iv) in response to receiving, from driver device (or the on-board computing system of the AV), information indicating that the service has completed as a result of an input being provided at the driver device or the on-board computing system from the driver or the user, and/or (v) in response to determining that the vehicle has been positioned within a predetermined distance of the destination location for a predetermined duration of time based on location information of the vehicle.

After determining that the service has been completed, the service arrangement system 190 can detect whether the object (that was previously detected in the vehicle) has been removed from the vehicle based on a second set of sensor information from one or more sensors of the vehicle (e.g., at a second time) (250). For example, the service arrangement system 190 can receive the second set of sensor information from the system 100 and can compare the first and second sets of sensor information to determine if there is a difference, e.g., difference in imagery, difference in weight, difference in compression information, etc. As an alternative, the system 100 can perform the comparison operation and provide an indication of whether the object has been removed to the service arrangement system 190. The system 100 can trigger the sensors to determine sensor data (e.g., perform detection or measurement) at a particular instance in time, depending on examples, such as in response to detecting that the service has been completed, or after a predetermined duration of time since detecting that the service has been completed.

Alternatively, the service arrangement system 190 can determine whether the object has been removed from the vehicle before the service is determined to be completed. For example, the service arrangement system 190 (or the system 100) can perform the object detection process in response to determining that the AV has reached or is close to the destination location and/or has been stationary for a duration of time while at or close to the destination location. In another example, the service arrangement system 190 can determine that the service has been completed in response to detecting that the object has been removed from the vehicle (e.g., after performing step 250).

If the service arrangement system 190 determines that the object has been removed from the vehicle, it can determine that no remedial action needs to be performed, as the user in the vehicle has taken the object with him or her, or another user has removed the object (e.g., at the delivery destination location) (270). On the other hand, if the service arrangement system 190 determines that the object has not been removed, the service arrangement system 190 can automatically perform one or more remedial actions (260). For example, the service arrangement system 190 can message the driver and/or the user, via the respective applications on the driver device and/or the user device, to inform them about the misplaced object. The message can include instructions (e.g., including navigation instructions) for enabling the driver and the user to meet up at a location, e.g., the destination location, to enable the user to retrieve the object.

In another example, the service arrangement system 190 can transmit a message or notification to the user device and enable the user to request a delivery of the object to a location specified by the user. Still further, in one example, if the vehicle is an AV, the service arrangement system 190 can transmit vehicle control instructions to the AV to cause the AV to travel to a specified location. Such a specified location can correspond to a new meeting location (delivery drop off location) for the user specified in the user's subsequent delivery transport service request, or a designated storage or warehouse location to house misplaced objects. The service arrangement system 190 can also message the user device to provide such location information on where the user can retrieve the object.

FIG. 3 illustrates another example method for detecting objects within a vehicle in connection with a transport service. In one example, one or more steps of the method described in FIG. 3 can be performed concurrently with one or more steps of the method described in FIG. 2. For purpose of simplicity, the example method of FIG. 3 is described as being performed by the system 100 operating on an on-board computing system of an autonomous vehicle.

In FIG. 3, the system 100 (of the AV) can receive service instructions from the service arrangement system 190 for the AV to provide a service for a requesting user (300). As described herein, a service can have a start location and a destination location, and can correspond to a delivery of an object or a person (e.g., the requesting user). The system 100 can process the service instructions in order to determine what service to provide, where to travel to (e.g., from the current location, to the start/pickup location, then to the destination location), and how to travel there (e.g., the route to take).

Based on the service instructions, map data, and/or sensor data used for operating the AV (e.g., data from sensors mounted on the body of the AV), the system 100 can control the AV to travel to the start location, and concurrently, monitor the movement of the AV (310). The system 100 can correspond to, include, or be in communication with the AV control system to control the operation of the AV by sending control signals to vehicle control modules of various subsystems in response to receiving sensor data from the sensors and feedback signals from various vehicle components. The system 100 can also determine the location of the AV from GPS data, for example, and monitor the current position as compared to the route and/or the start location. Using the periodically determined current location of the AV, the system 100 can determine when the AV arrives at or is within a predetermined distance of the start location (e.g., the AV is close to the start location). In one example, when the system 100 determines that the AV is close to the start location, the system 100 can change the state of the AV (from the on route state to the arriving now or has arrived state).

At a time after determining that the AV is close to the start location, the system 100 can perform an object detection process to detect that an object has been placed within the AV (320). Depending on implementation, the system 100 can periodically perform the object detection process, as described in FIGS. 1 and 2, from the time after determining that the AV is close to the start location to a time after the AV begins traveling to the destination location. In one example, the system 100 can perform the object detection process in response to determining that the service has started or can perform the object detection process before or concurrently while determining that the service has started. In the example of FIG. 3, the system 100 can detect that that an object (e.g., a box) has been placed in the back seat of the AV from sensor information received from the AV, as described in FIGS. 1 and 2.

Once the service has started, the system 100 can control the AV to travel to the destination location, and also monitor the vehicle and/or the progress of the service (330). Similarly as described above, the system 100 can determine the location of the AV from GPS data and monitor the current position as compared to the route and/or the destination location. The system 100 can determine when the AV arrives at or is within a predetermined distance of the destination location (e.g., the AV is close to the destination location) (340). At a time after determining that the AV is close to the destination location, the system 100 can perform an object detection process to detect whether the object has been removed from within the AV (350). Depending on implementation, step 350 can be performed before, after, or while determining that the service has been completed.

If the system 100 determines that the object has been removed from the AV, the system 100 can determine that no remedial action needs to be performed (370). On the other hand, if the system 100 determines that the object is still present in the vehicle, the system 100 can perform one or more remedial actions and/or cause the service arrangement system 190 to perform one or more remedial actions, such as described in FIGS. 1 and 2 (360).

FIGS. 4A through 4D illustrate examples of user interfaces displayed on a mobile computing device in various use case examples. For each of the examples illustrated in FIGS. 4A through 4D, an individual user interface can be displayed on a user device of a user who has left an object in a vehicle in connection with the user's transport service. Depending on implementation, the user interface can be displayed as part of a designated application associated with the service arrangement system 190 or as part of another application operating on the user device (e.g., email application, text message application, a web browser application, etc.). In one example, a notification can be displayed on the user device, and selection of a feature or notification can cause the user interface to be displayed on the user device.

Figure 4A:
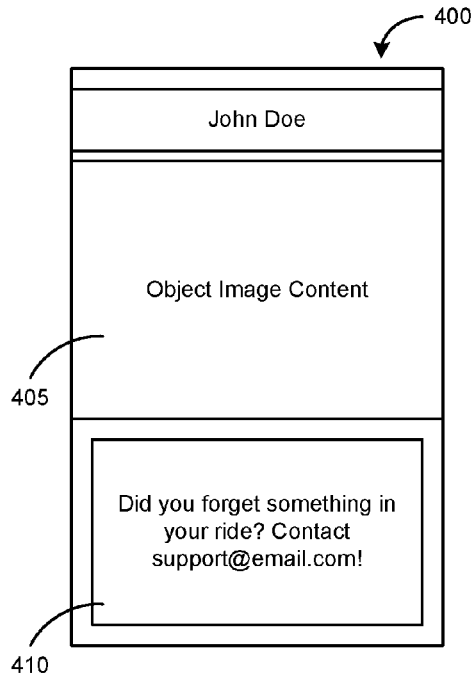
FIGS. 4A through 4D illustrate examples of user interfaces displayed on a mobile computing device in various use case examples.

Referring to FIG. 4A, in one example, the user device can receive a notification or a message from the service arrangement system 190 or the system 100 after (or in some instances, just before) the service has ended. The application running on the user device can display the user interface 400, which includes image content 405 of the object and textual content 410 reminding the user and/or notifying the user that the object was left in the vehicle. The image content 405 can be generated from image information from one or more sensors (e.g., cameras) of the vehicle. Alternatively, if a camera is not used in the vehicle, other content representing the object can be displayed in place of the image content 405, such as additional textual content or other graphics or placeholder images representing the object. The textual content 410, in this example, also provides a contact information for the user to message in order to determine what to do in order to retrieve the object.

Figure 4B:
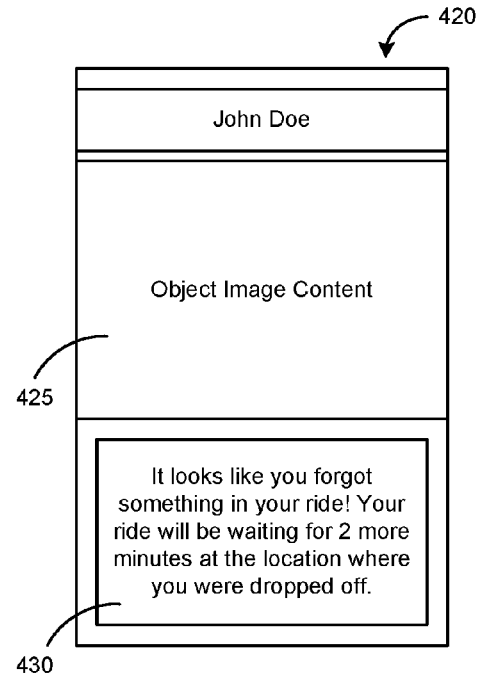

In the example of FIG. 4B, a user interface 420 can be displayed on the user device. The user interface 420 can also include image content 425, such as described in FIG. 4A, and textual content 430 notifying the user that the object was left in the vehicle and informing the user of a specific location in which to pick up the object. For example, the service arrangement system 190 can instruct the AV or the driver to travel to a specific location (or remain at the destination location or where the user was dropped off). The service arrangement system 190 can generate textual content 430 to include corresponding content about the location. In FIG. 4B, the textual content 430 informs the user that the vehicle with the object will be waiting for 2 more minutes (or some other predetermined duration of time) where the user was dropped off.

Figure 4C:
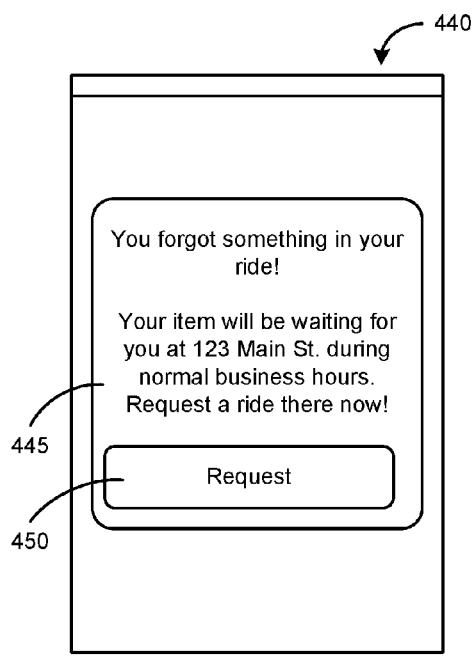

According to another example, a user interface 440 of FIG. 4C can be displayed on the user device as an interactive notification prompt. Such a notification prompt can be in-app (e.g., displayed as part of the application user interface) or out-of-app (e.g., displayed when the application is not currently open and using native user interface notification features of an operating system of a mobile device). In this example, the user interface 440 includes textual content 445 that includes a specific location at which the user's object will be stored or held. The textual content 445 can include location information (e.g., address or street intersection), a time or duration of time when the user can pick up the object (e.g., "normal business hours" or "8 am to 6 pm"), and a selectable feature 450 that the user can select in order to request a transport service to the specified location. If the user selects the selectable feature ("Request" or "Request trip") 450, the designated service application can be opened or launched on the user device, so that the user can confirm the transport service to the specified location (e.g., from the user's current location or from a specified pickup location). Alternatively, if the user selects the selectable feature 450, the designated service application can automatically generate and transmit a request for the transport service to the service arrangement system 190. The request can include the type of service (e.g., transport the user), the pickup location (e.g., the current location of the user device determined via the GPS receiver of the user device), and the destination location (e.g., 123 Main Street).

Figure 4D:
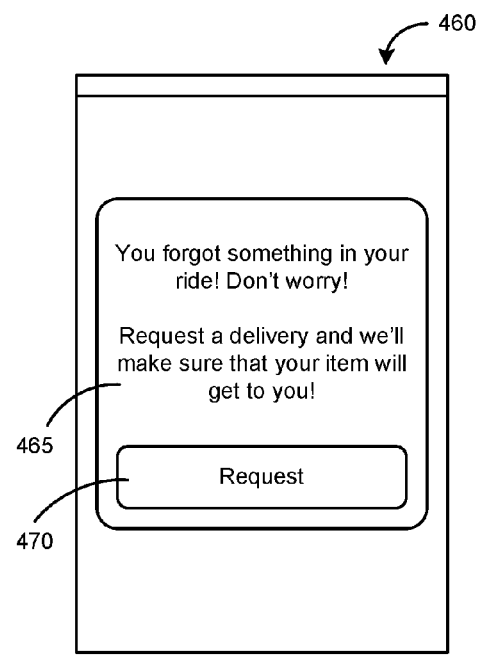

In another example, such as illustrated in FIG. 4D, a user interface 460 can include textual content 465 to inform the user that the user can request a delivery of the user's object. The user interface 460 can enable the user to select a selectable feature 470 to request a delivery transport service of the user's object to the user's current location. Similar to the example of FIG. 4C, if the user selects the selectable feature 470, the designated service application can be opened or launched on the user device, so that the user can confirm the delivery transport service of the user's object to the specified location (e.g., from the user's current location or from a specified pickup location) or the designated service application can automatically generate and transmit a request for the delivery transport service to the service arrangement system 190. In the latter example, the request can include the type of service (e.g., delivery of the object in the specific vehicle that has the user's object), and the drop off or destination location (e.g., the current location of the user device determined via the GPS receiver of the user device). As described in FIG. 1, for example, the service arrangement system 190 can identify the particular vehicle that the user had just previously used or the vehicle that is associated with the trip entry having the identified object, and select that vehicle to go to the user's current location.

Figure 5:
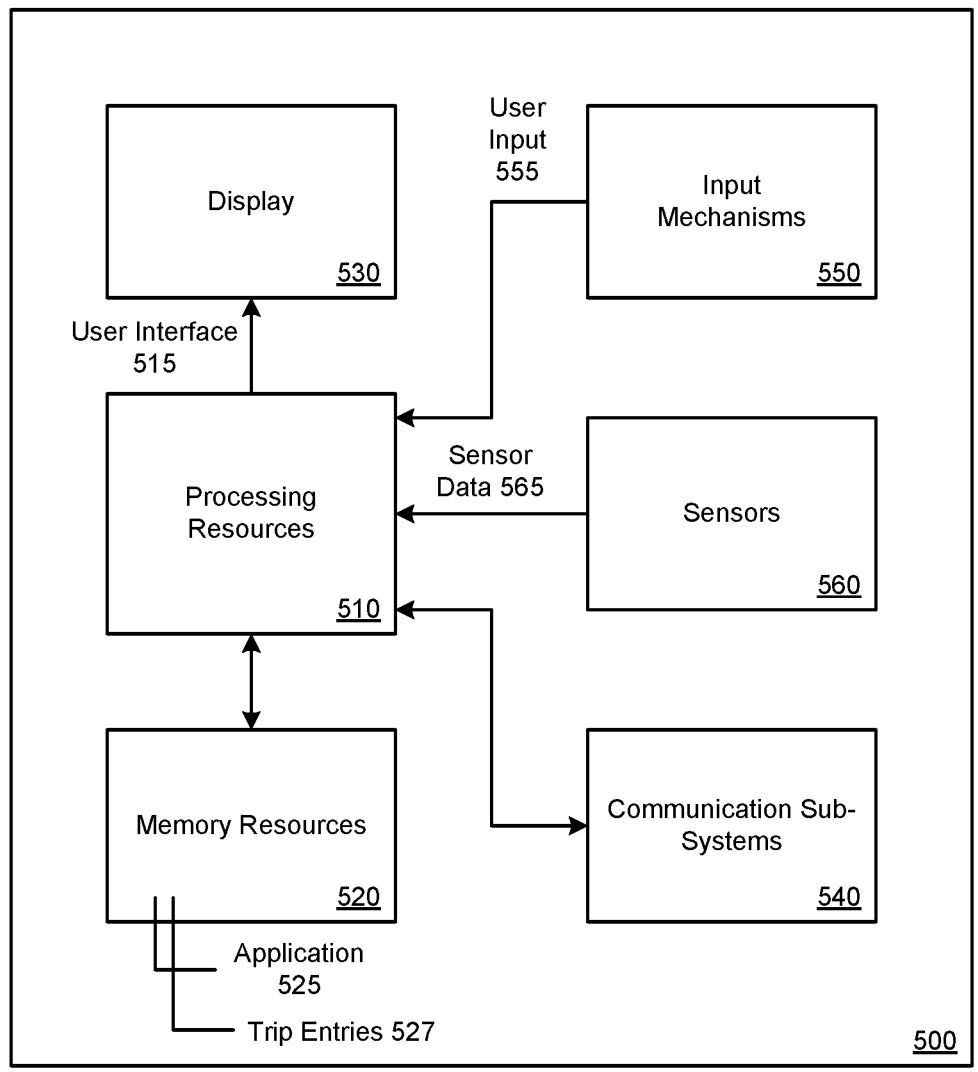
FIG. 5 is a block diagram that illustrates a computing device upon which embodiments described herein may be implemented.

According to some examples, a user interface described in any of FIGS. 4A through 4D can also include detailed information about the object, such as what the object is (including color or shape), the object type, the dimensions and/or weight of the object, where the object was placed, etc. While the examples of FIGS. 4A through 4D are described with respect to the user device, in some variations, such user interfaces can also be displayed on the driver device to inform the driver of an object that has been left behind in his or her vehicle. Such a user interface can instruct the driver where to go, where to wait (and/or for how long), and/or who to meet with, so that the user can retrieve the object.
Hardware Diagrams FIG. 5 is a block diagram that illustrates a computing device upon which embodiments described herein may be implemented. In one example, a computing device 500 may correspond to a mobile computing device, such as a cellular device that is capable of telephony, messaging, and data services. The computing device 500 can correspond to a user device or a driver device. Examples of such devices include smartphones, handsets or tablet devices for cellular carriers. The computing device 500 includes a processor 510, memory resources 520, a display device 530 (e.g., such as a touch-sensitive display device), one or more communication sub-systems 540 (including wireless communication sub-systems), input mechanisms 550 (e.g., an input mechanism can include or be part of the touch-sensitive display device), and one or more sensors 560, including a location detection mechanism (e.g., GPS receiver). In one example, at least one of the communication sub-systems 540 sends and receives cellular data over data channels and voice channels. The communications sub-systems 540 can include a cellular transceiver and one or more short-range wireless transceivers. The processing resources 510 can receive communications from the service arrangement system, for example, via the communications sub-systems 540.

In the example of FIG. 5, the computing device 500 can correspond to a driver device that is operated by a driver of a vehicle. The processor 510 can provide a variety of content to the display 530 by executing instructions stored in the memory resources 520. The memory resources 520 can store instructions corresponding to the driver application 525, for example, and other data, such as one or more trip entries 527, one or more parameters, or databases of location data points. For example, the processor 510 is configured with software and/or other logic to perform one or more processes, steps, and other functions described with implementations, such as described by FIGS. 1 through 4D, and elsewhere in the application. In particular, the processor 510 can execute instructions and data stored in the memory resources 520 in order to be notified about a transport service the driver is to provide, and in connection with the transport service, can use sensor data 565 to perform object detection processes. The sensors 560, as represented herein, can include a sensor included with the computing device 500 (e.g., a GPS receiver) as well as sensor interfaces that communicate with one or more sensors of the vehicle (e.g., ultrasound sensors, weighing devices, etc.). The processor 510 can also execute instructions corresponding to the driver application 525 to cause various user interfaces 515 to be displayed on the display 530, such as an invitation to provide a transport service, navigation information, or notifications about a user having left an object in the driver's vehicle. In addition, the user interfaces 515 can include selectable features that the driver can select, by providing user input 555 via the input mechanisms 550 (e.g., in combination with a touch-sensitive display 530), to interact with the driver application 525, such as to indicate when the transport service has started or completed, in some examples.

While FIG. 5 is illustrated for a mobile computing device, one or more examples may be implemented on other types of devices, including full-functional computers, such as laptops and desktops (e.g., PC). In another example, a variation of FIG. 5 can illustrate (at least a portion of) an on-board computing system of an AV, such has described in FIG. 1.

Figure 6:
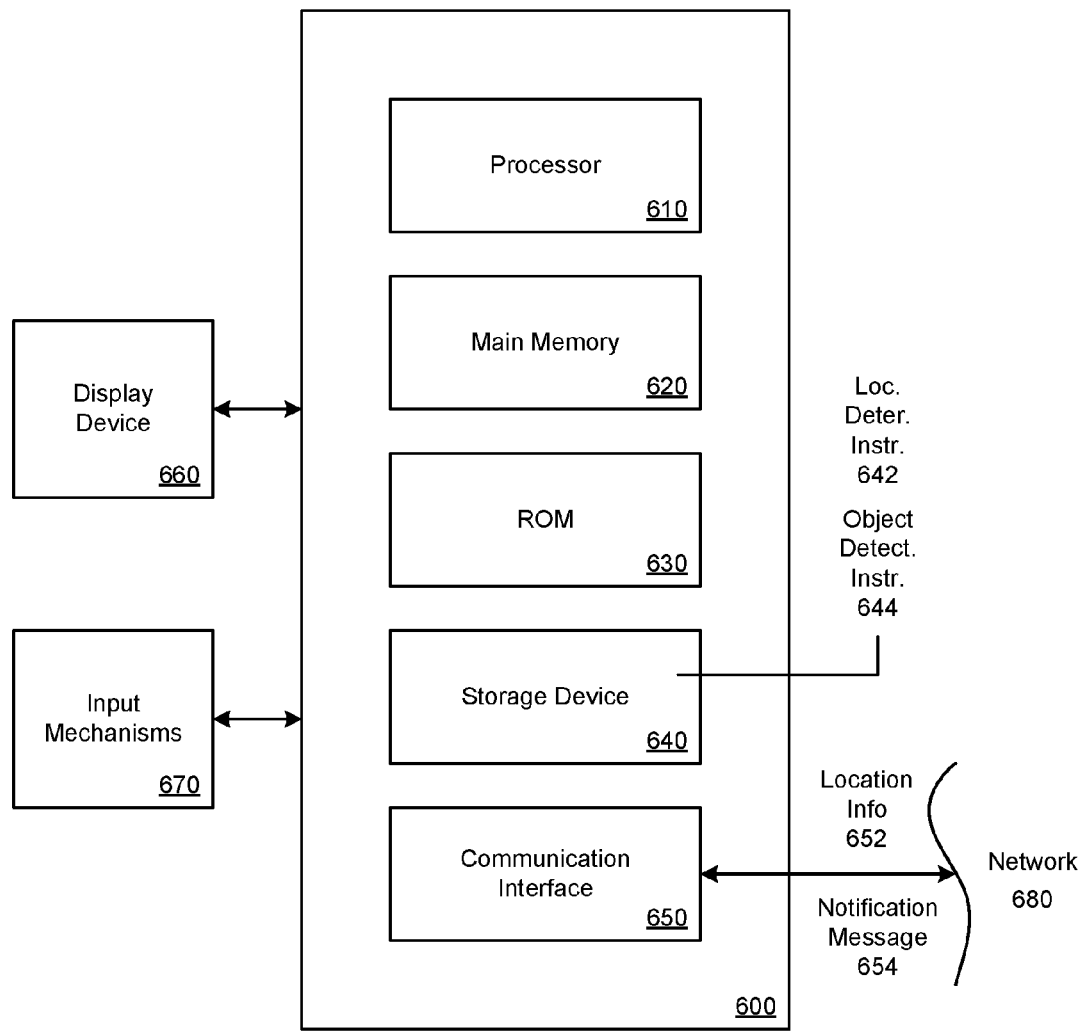
FIG. 6 is a block diagram that illustrates a computer system upon which examples described herein may be implemented.

FIG. 6 is a block diagram that illustrates a computer system upon which examples described herein may be implemented. For example, in the context of FIG. 1, the service arrangement system 190 may be implemented using a computer system such as described by FIG. 6. The service arrangement system 190 may also be implemented using a combination of multiple computer systems as described by FIG. 6.

In one implementation, the computer system 600 includes processing resources, such as one or more processors 610, a main memory 620, a read-only memory (ROM) 630, a storage device 640, and a communication interface 650. The computer system 600 includes at least one processor 610 for processing information and the main memory 620, such as a random access memory (RAM) or other dynamic storage device, for storing information and instructions to be executed by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. The storage device 640, such as a magnetic disk or optical disk, is provided for storing information and instructions. For example, the storage device 640 can correspond to a computer-readable medium that stores location determination instructions 642 and object detection instructions 644 for performing operations discussed with respect to FIGS. 1 through 5. In such examples, the computer system 600 can determine the locations of the vehicles, determine the service locations of the transport services, and perform object detection processes based on sensor data received from the vehicle systems or driver devices. In addition, the storage device 640 can include other instructions, such as instructions to implement a dispatch sub-system, which receives requests for transport services from requesting users and selects vehicles to provide those transport services.

The communication interface 650 can enable the computer system 600 to communicate with one or more networks 680 (e.g., cellular network) through use of the network link (wirelessly or using a wire). Using the network link, the computer system 600 can communicate with a plurality of devices, such as the mobile computing devices of the riders and drivers. According to some examples, using the communication interface 650, the computer system 600 can receive location information 652 from the driver devices, AVs, and/or user devices, and can transmit notification messages 654 to user devices to inform users if users' belongings have been left in a vehicle, such as described by some examples of FIGS. 1 through 5.

The computer system 600 can also include a display device 660, such as a cathode ray tube (CRT), an LCD monitor, or a television set, for example, for displaying graphics and information to a user. An input mechanism 670, such as a keyboard that includes alphanumeric keys and other keys, can be coupled to the computer system 600 for communicating information and command selections to the processor 610. Other non-limiting, illustrative examples of the input mechanisms 670 include a mouse, a trackball, touch-sensitive screen, or cursor direction keys for communicating direction information and command selections to the processor 610 and for controlling cursor movement on the display 660.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method for operating an autonomous vehicle, the method being implemented by one or more processors of the autonomous vehicle and comprising:
   receiving instructions to transport a passenger from a start location to a destination;
   after the autonomous vehicle arrives at the start location, detecting that an object has been placed in a trunk of the autonomous vehicle based on a set of information from one or more sensors of the autonomous vehicle; and
   after the autonomous vehicle arrives at or near the destination, automatically initiating performance of at least one action to have the object removed from the trunk, including opening the trunk.

2. The method of claim 1, wherein the one or more sensors of the autonomous vehicle include one or more of (i) a camera, (ii) a weighing device, (iii) a suspension sensor, (iv) a light detection and ranging (LIDAR) sensor, (v) a radio-frequency transceiver, or (vi) an ultrasound sensor.

3. The method of claim 1, wherein detecting that the object has been placed in the trunk includes detecting a position of the object inside the autonomous vehicle based on image information from one or more cameras positioned within the autonomous vehicle.

4. The method of claim 1, wherein detecting that the object has been placed in the trunk includes using a trunk sensor that detects when the trunk is opened and closed.

5. The method of claim 1, wherein detecting that the object has been placed in the trunk is based on compression information, detected by a set of sensors that are positioned to detect compression of a portion of the autonomous vehicle.

6. The method of claim 1, wherein detecting that the object has been placed in the trunk includes determining that an electronic device is in the autonomous vehicle based on radio-frequency signals emitted by the object.

7. The method of claim 1, wherein detecting that the object has been placed in the trunk includes determining a first set of sensor information from a first sensor set of the autonomous vehicle when a transport service is being provided, and determining a second set of sensor information from the first sensor set of the autonomous vehicle after the autonomous vehicle arrives at the destination, and comparing the first set of sensor information to the second set of sensor information.

8. The method of claim 1, wherein automatically initiating performance of the at least one action includes communicating, over one or more networks, a message to a computing device associated with the passenger, the message notifying the passenger that the object is in the autonomous vehicle.

9. The method of claim 8, wherein automatically initiating performance of the at least one action includes:
   after the autonomous vehicle arrives at the destination, causing the autonomous vehicle to remain stationary at a selected location until the object is detected as being removed from the autonomous vehicle.

10. The method of claim 9, wherein automatically initiating performance of the at least one action includes causing the autonomous vehicle to travel to the selected location to await removal of the object by the passenger.

11. The method of claim 1, further comprising:
    determining, from the one or more sensors, when the object is initially placed in the trunk by the passenger who enters the autonomous vehicle at the start location.

12. The method of claim 11, wherein detecting when the object is initially placed in the trunk is performed in response to one of (i) detecting that the passenger has entered the autonomous vehicle, (ii) detecting that a predetermined duration of time has elapsed since detecting that the passenger has entered the autonomous vehicle, (iii) receiving, from a computing device associated with the passenger, a message indicating that service can begin as a result of an input being provided at the computing device associated with the passenger, (iv) receiving, from a computing device associated with the autonomous vehicle, a message indicating that the service can begin as a result of an input being provided at the computing device associated with the autonomous vehicle from the passenger within the autonomous vehicle, or (v) determining that the autonomous vehicle has been positioned within a predetermined distance of the start location for a predetermined duration of time based on location information of the autonomous vehicle.

13. An autonomous vehicle comprising:
    one or more sensors generating a set of information; and
    a control system to execute instructions that cause the control system to:
    receive instructions to transport a passenger from a start location to a destination;
    after the autonomous vehicle arrives at the start location, detect that an object has been placed in a trunk of the autonomous vehicle based on the set of information from the one or more sensors; and after the autonomous vehicle arrives at or near the destination, automatically initiate performance of at least one action to have the object removed from the trunk, including opening the trunk.

14. The autonomous vehicle of claim 13, wherein the one or more sensors include one or more of (i) a camera, (ii) a weighing device, (iii) a suspension sensor, (iv) a light detection and ranging (LIDAR) sensor, (v) a radio-frequency transceiver, or (vi) an ultrasound sensor.

15. The autonomous vehicle of claim 13, wherein detecting that the object has been placed in the trunk includes detecting a position of the object inside the autonomous vehicle based on image information from one or more cameras positioned within the autonomous vehicle.

16. The autonomous vehicle of claim 13, wherein detecting that the object has been placed in the trunk includes using a trunk sensor that detects when the trunk is opened and closed.

17. The autonomous vehicle of claim 13, wherein detecting that the object has been placed in the trunk is based on compression information, detected by a set of sensors that are positioned to detect compression of a portion of the autonomous vehicle.

18. The autonomous vehicle of claim 13, wherein detecting that the object has been placed in the trunk includes determining that an electronic device is in the autonomous vehicle based on radio-frequency signals emitted by the object.

19. The autonomous vehicle of claim 13, wherein detecting that the object has been placed in the trunk includes determining a first set of sensor information from a first sensor set of the autonomous vehicle when a transport service is being provided, and determining a second set of sensor information from the first sensor set of the autonomous vehicle after the autonomous vehicle arrives at the destination, and comparing the first set of sensor information to the second set of sensor information.

20. A non-transitory computer-readable medium storing instructions that, when executed by one or more processors of an on-board computing system of an autonomous vehicle, causes the on-board computing system to:

receive instructions to transport a passenger from a start location to a destination;

after the autonomous vehicle arrives at the start location, detect that an object has been placed in a trunk of the autonomous vehicle based on a set of information from one or more sensors of the autonomous vehicle; and after the autonomous vehicle arrives at or near the destination, automatically initiate performance of at least one action to have the object removed from the trunk, including opening the trunk.

\* \* \* \* \*